(12) United States Patent
Oba

(10) Patent No.: US 9,677,477 B2
(45) Date of Patent: Jun. 13, 2017

(54) FUEL SYSTEM FOR AN ENGINE THAT IS CAPABLE OF SELECTIVELY OPERATING A CENTRIFUGAL PUMP TO SUPPLEMENT A CONSTANT VOLUME PUMP

(71) Applicant: IHI Corporation, Koto-ku (JP)

(72) Inventor: Daisuke Oba, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/073,768

(22) Filed: Mar. 18, 2016

(65) Prior Publication Data

US 2016/0201564 A1 Jul. 14, 2016

Related U.S. Application Data

(63) Continuation of application No. PCT/JP2014/074219, filed on Sep. 12, 2014.

(30) Foreign Application Priority Data

Sep. 25, 2013 (JP) .................................. 2013-198823

(51) Int. Cl.
*F02C 9/30* (2006.01)
*F02C 7/236* (2006.01)
*F23K 5/04* (2006.01)

(52) U.S. Cl.
CPC ............... *F02C 9/30* (2013.01); *F02C 7/236* (2013.01); *F23K 5/04* (2013.01)

(58) Field of Classification Search
CPC .. F02C 9/30; F02C 7/236; F02C 7/232; F23K 5/04; F04B 23/04; F04B 23/12; F04B 23/14; F04D 13/12
See application file for complete search history.

(56) References Cited

U.S. PATENT DOCUMENTS 3,026,929 A 3/1962 Burns
3,614,269 A * 10/1971 Lanctot ................... F02C 7/236
417/233

(Continued)

FOREIGN PATENT DOCUMENTS

JP 60-135630 7/1985
JP 2006-83864 3/2006

(Continued)

OTHER PUBLICATIONS

International Search Report issued Oct. 28, 2014 in PCT/JP2014/074219, filed Sep. 12, 2014 (with English Translation).

*Primary Examiner* — William H Rodriguez
*Assistant Examiner* — Christopher Brunjes
(74) *Attorney, Agent, or Firm* — Oblon, McClelland, Maier & Neustadt, L.L.P.

(57) ABSTRACT

A fuel system includes: a constant-volume pump and a centrifugal pump increasing the pressure of fuel to be supplied to an engine for aviation and discharging the fuel; an operation controller configured to select in accordance with the operation state of the engine, one of a constant-volume pump-using mode of increasing the pressure of fuel using the constant-volume pump and a centrifugal pump-using mode of increasing it using the centrifugal pump; and a speed changer connecting the engine and the centrifugal pump, changing the rotational speed of rotational power output from the engine and transmitting the rotational power to the centrifugal pump, and being capable of adjusting the speed-changing ratio of the rotational speed.

1 Claim, 2 Drawing Sheets

(56) References Cited

U.S. PATENT DOCUMENTS

| | | | |
|---|---|---|---|
| 3,946,551 A | | 3/1976 | Linebrink et al. |
| 4,332,527 A | | 6/1982 | Moldovan et al. |
| 4,607,486 A | | 8/1986 | Cole |
| 5,118,258 A | * | 6/1992 | Martin .................... F02C 7/236 417/3 |
| 2006/0053803 A1 | | 3/2006 | Parsons |
| 2011/0139123 A1 | | 6/2011 | Brocard et al. |

FOREIGN PATENT DOCUMENTS

| | | |
|---|---|---|
| JP | 2006-207596 | 8/2006 |
| JP | 2008-530442 | 8/2008 |

* cited by examiner

FUEL SYSTEM FOR AN ENGINE THAT IS CAPABLE OF SELECTIVELY OPERATING A CENTRIFUGAL PUMP TO SUPPLEMENT A CONSTANT VOLUME PUMP

This application is a Continuation Application based on International Application No. PCT/JP2014/074219, filed Sep. 12, 2014, which claims priority on Japanese Patent Application No. 2013-198823, filed Sep. 25, 2013, the contents of both of which are incorporated herein by reference.

TECHNICAL FIELD

The present disclosure relates to a fuel system.

BACKGROUND

An airplane has a fuel system used for supplying a needed amount of fuel to a combustion engine. Such a fuel system is provided with a fuel pump which increases the pressure of fuel discharged from a fuel tank. A constant-volume pump or a centrifugal pump is used for the fuel pump, and the constant-volume pump includes a gear pump or the like.

Although Patent Document 1 or 2 proposes a configuration in which an electric motor is used for the driving source of the fuel pump, in this configuration, the size of the fuel system may be increased and the fuel system may be complicated. In addition, since electric power used for driving the electric motor is generated using power of the engine, a loss due to electric power conversion may occur, and thus the energy efficiency may deteriorate. Accordingly, it is preferable that the fuel pump be connected to the engine and be driven using rotational power output from the engine.

DOCUMENT OF RELATED ART

Patent Document

[Patent Document 1] U.S. Pat. No. 3,946,551
[Patent Document 2] Published Japanese Translation No. 2008-530442 of the PCT International Publication

SUMMARY

Technical Problem

The centrifugal pump has a characteristic of discharging liquid at a discharge pressure proportional to the square of the rotational speed thereof.

When the centrifugal pump is rotationally driven by the rotational power output from the engine, the rotational speed of the centrifugal pump is proportional to the rotational speed of the engine. Therefore, in a case where the centrifugal pump is used, although a sufficient discharge pressure is obtained when the rotational speed of the engine is high, the discharge pressure may be insufficient when the rotational speed of the engine is low. In order to compensate for an insufficiency of the discharge pressure of the centrifugal pump, it is conceivable that a constant-volume pump such as a gear pump, which can generate a sufficient discharge pressure even when the rotational speed of the engine is low, is provided therein.

The centrifugal pump and the constant-volume pump are completely different in mechanism, and in many cases, the discharge pressures of these pumps are not matched to each other even when the rotational speeds thereof are the same. Accordingly, in a configuration in which the centrifugal pump and the constant-volume pump are provided in the fuel system and both of these pumps are rotationally driven so that the rotational speeds thereof are proportional to the rotational speed of the engine, when the fuel system is switched between a mode of increasing the pressure of fuel using the centrifugal pump and another mode of increasing it using the constant-volume pump, the pressure of fuel may change, and thus vibrations or the like may occur.

The present disclosure has been made in view of the above problems, and an object thereof is to limit vibrations or the like occurring when a fuel system including a centrifugal pump and a constant-volume pump is switched between a mode of increasing the pressure of fuel using the centrifugal pump and another mode of increasing the pressure of fuel using the constant-volume pump.

Solution to Problem

The present disclosure adopts the following configurations as means to solve the above problems.

A first aspect of the present disclosure is a fuel system including: a constant-volume pump and a centrifugal pump increasing the pressure of fuel to be supplied to an engine for aviation and discharging the fuel; an operation controller configured to select in accordance with the operation state of the engine, one of a constant-volume pump-using mode of increasing the pressure of fuel using the constant-volume pump and a centrifugal pump-using mode of increasing the pressure of fuel using the centrifugal pump; and a speed changer connecting the engine and the centrifugal pump, changing the rotational speed of rotational power output from the engine and transmitting the rotational power to the centrifugal pump, and being capable of adjusting the speed-changing ratio of the rotational speed.

A second aspect of the present disclosure is the fuel system of the first aspect further including: a first flow passageway in which the centrifugal pump is provided; a second flow passageway in which the constant-volume pump is provided; and a shut-off mechanism provided on an upstream side of the centrifugal pump in the first flow passageway, and configured to block the first flow passageway when the fuel system is in the constant-volume pump-using mode and to open the first flow passageway when the fuel system is in the centrifugal pump-using mode.

A third aspect of the present disclosure is that the fuel system of the second aspect further includes: a third flow passageway whose first end is connected to a downstream end of the first flow passageway and to a downstream end of the second flow passageway, and whose second end is connected to an upstream side of the constant-volume pump in the second flow passageway; and a switching mechanism configured to connect the downstream end of the second flow passageway and the third flow passageway when the fuel system is in the constant-volume pump-using mode, and to connect the downstream end of the first flow passageway and the third flow passageway when the fuel system is in the centrifugal pump-using mode.

Effects

According to the present disclosure, the engine and the centrifugal pump are connected via the speed changer capable of adjusting the speed-changing ratio thereof. Therefore, the rotational speed of the centrifugal pump can be changed without being proportional to the rotational speed of the engine. Thus, when the fuel system is switched between a mode of increasing the pressure of fuel using the centrifugal pump and another mode of increasing the pressure of fuel using the constant-volume pump, the discharge pressure of the centrifugal pump can be matched to the discharge pressure of the constant-volume pump. Consequently, according to the present disclosure, it is possible to limit vibrations or the like occurring when the fuel system including the centrifugal pump and the constant-volume pump is switched between the mode of increasing the pressure of fuel using the centrifugal pump and the mode of increasing the pressure of fuel using the constant-volume pump.

DESCRIPTION OF EMBODIMENTS

Hereinafter, an embodiment of a fuel system of the present disclosure is described with reference to the drawings. In the following drawings, the scale of each member is appropriately changed in order to show each member in a recognizable size.

Figure 1:
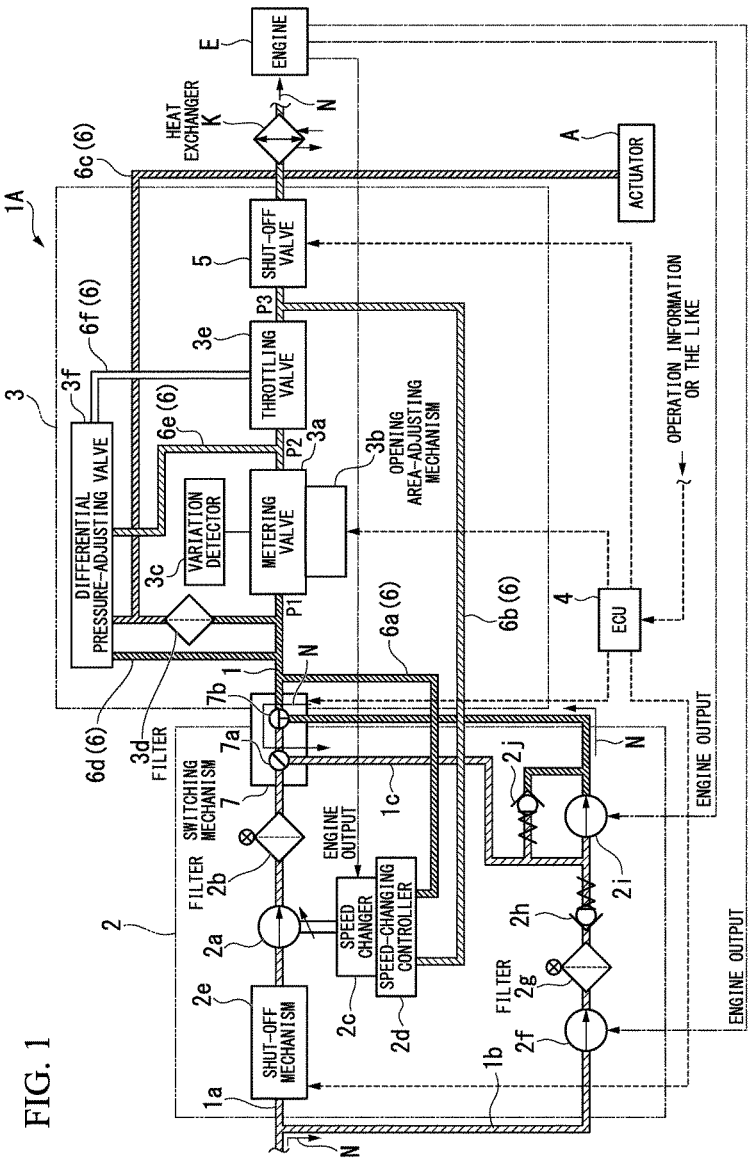
FIG. 1 is a system block diagram showing a schematic configuration of a fuel system 1A of an embodiment when the fuel system 1A is in a mode (a constant-volume pump-using mode) of increasing the pressure of fuel using a constant-volume pump.
Figure 2:
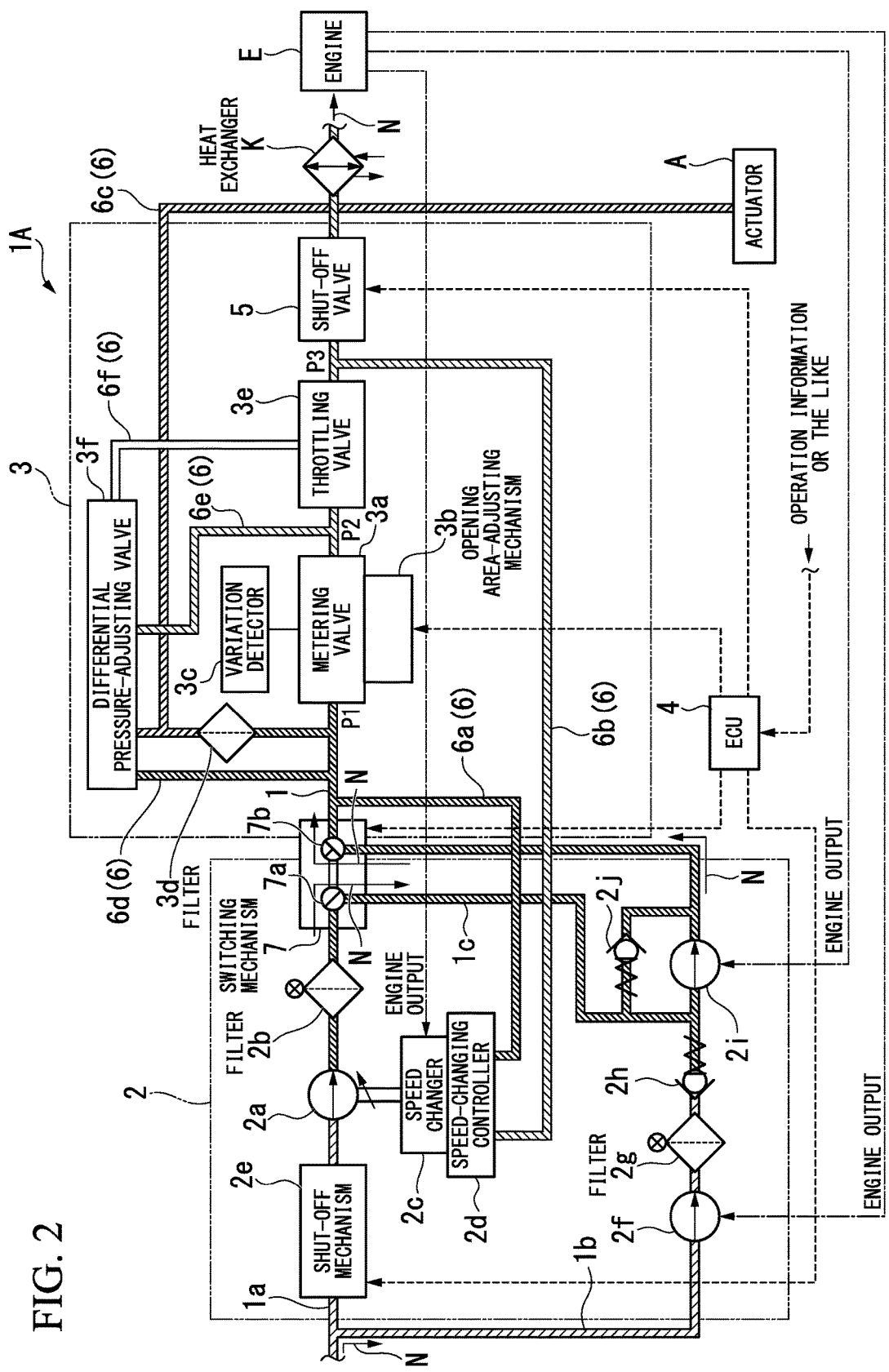
FIG. 2 is a system block diagram showing the schematic configuration of the fuel system 1A of the embodiment when the fuel system 1A is in a mode (a centrifugal pump-using mode) of increasing the pressure of fuel using a centrifugal pump.

FIGS. 1 and 2 are system block diagrams showing a schematic configuration of a fuel system 1A of this embodiment. FIG. 1 shows that the fuel system 1A is in a mode (a constant-volume pump-using mode) of increasing the pressure of fuel N using a constant-volume pump 2i, and FIG. 2 shows that the fuel system 1A is in another mode (a centrifugal pump-using mode) of increasing the pressure of fuel N using a centrifugal pump 2a. The components shown in FIGS. 1 and 2 are the same as each other, but the operation states of components and the flowing routes of fuel are different.

The fuel system 1A of this embodiment is provided in an airplane, and increases the pressure of fuel stored in a fuel tank (not shown) and supplies a needed amount of the fuel to a combustion engine for aviation. As shown in FIG. 1, the fuel system 1A of this embodiment includes a main pipe 1, a fuel pump mechanism 2, a measuring mechanism 3, an ECU 4, a shut-off valve 5, a pressure-leading pipe 6 and a switching mechanism 7.

The main pipe 1 is a pipe connecting the fuel tank and a combustor (not shown) of the engine, and guides fuel N from the left side (fuel tank-side) to the right side (engine-side) of FIG. 1. That is, the main pipe 1 of this embodiment is a pipe linearly extending from the left side to the right side of FIG. 1. The main pipe 1 branches into a first flow passageway 1a, a second flow passageway 1b and a third flow passageway 1c inside the fuel pump mechanism 2. The first flow passageway 1a is a flow passageway in which the centrifugal pump 2a is provided, and the second flow passageway 1b is a flow passageway in which the constant-volume pump 2i is provided. The upstream ends of the first flow passageway 1a and of the second flow passageway 1b are connected to each other on the left side of FIG. 1, and the downstream ends of the first flow passageway 1a and of the second flow passageway 1b are connected to each other via the switching mechanism 7 (described later). That is, the first and second flow passageways 1a and 1b are arranged to be parallel to each other. In the third flow passageway 1c, a first end (a first end of the third flow passageway 1c ) is connected via the switching mechanism 7 to the downstream end of the first flow passageway 1a and to the downstream end of the second flow passageway 1b, and a second end (a second end of the third flow passageway 1c) is connected to an upstream side of the constant-volume pump 2i within the second flow passageway 1b.

The fuel pump mechanism 2 is disposed on an upstream side of the measuring mechanism 3 in the flow direction of the main pipe 1. The fuel pump mechanism 2 includes the centrifugal pump 2a, a filter 2b, a speed changer 2c, a speed-changing controller 2d, a shut-off mechanism 2e, a low-pressure centrifugal pump 2f, a filter 2g, a check valve 2h, the constant-volume pump 2i and a check valve 2j.

The centrifugal pump 2a is attached to the first flow passageway 1a as described above. The centrifugal pump 2a is a pump which discharges fuel N at a discharge pressure proportional to the square of the rotational speed of the centrifugal pump 2a, that is, the discharge pressure increases at a high rotational speed and decreases at a low rotational speed. The filter 2b is disposed between the centrifugal pump 2a and a metering valve 3a (described later), and removes fine foreign objects contained in fuel N flowing through the main pipe 1 (the first flow passageway 1a ). In detail, the filter 2b is disposed between the centrifugal pump 2a and the switching mechanism 7.

The speed changer 2c connects an engine E and the centrifugal pump 2a, and changes the rotational speed (in other words, the rotational speed of the output shaft of the engine E) of rotational power output from the engine E and transmits the rotational power to the centrifugal pump 2a. The speed changer 2c is configured to be capable of adjusting the speed-changing ratio of the rotational speed. For example, a staged speed changer or a non-stage speed changer can be used for the speed changer 2c.

The speed-changing controller 2d is configured to control the speed-changing ratio of the speed changer 2c, and is provided integrally with the speed changer 2c. A pressure P1 of fuel N on the upstream side of the metering valve 3a is transmitted to the speed-changing controller 2d via a first pressure-leading pipe 6a which is part of the pressure-leading pipe 6. In addition, a pressure P3 of fuel N on the downstream side of a throttling valve 3e (described later) is transmitted to the speed-changing controller 2d via a second pressure-leading pipe 6b which is part of the pressure-leading pipe 6.

In this embodiment, the speed-changing controller 2d stores a set value of the difference between the pressures P1 and P3 in advance. When the actual difference between the pressures P1 and P3 is greater than the set value, the speed-changing controller 2d controls the speed-changing ratio of the speed changer 2c so that the rotational speed of the centrifugal pump 2a decreases, and when an actual difference between the pressures P1 and P3 is less than the set value, the speed-changing controller 2d controls the speed-changing ratio of the speed changer 2c so that the rotational speed of the centrifugal pump 2a increases. That is, the speed-changing controller 2d controls the speed-changing ratio of the speed changer 2c based on the actual difference between the pressures P1 and P3. Accordingly, a constant differential pressure can be always maintained between the pressures P1 and P3. That is, the differential pressure between the pressures P1 and P3 can be maintained to be matched to the above set value. Although not shown in FIG. 1 or 2, the speed-changing controller 2d is electrically connected to the ECU 4, and can also change the speed-changing ratio of the speed changer 2c based on instructions from the ECU 4.

The shut-off mechanism 2e is disposed on the upstream side of the centrifugal pump 2a within the first flow passageway 1a. Under the control of the ECU 4, the shut-off mechanism 2e blocks the first flow passageway 1a when the fuel system 1A is in the constant-volume pump-using mode and opens the first flow passageway 1a when the fuel system 1A is in the centrifugal pump-using mode. In addition, if the fuel system 1A can be smoothly switched between the constant-volume pump-using mode and the centrifugal pump-using mode, there is a case where the shut-off mechanism 2e is not provided therein.

The low-pressure centrifugal pump 2f is provided in an intermediate part of the second flow passageway 1b on the upstream side of the constant-volume pump 2i. The low-pressure centrifugal pump 2f is connected to the engine E of the airplane via a gearbox having a fixed speed-changing ratio, and is a centrifugal pump rotationally driven by the engine E so that the rotational speed of the centrifugal pump is proportional to that of the engine E. The low-pressure centrifugal pump 2f increases the pressure of fuel N flowing through the second flow passageway 1b to the extent that cavitation inside the constant-volume pump 2i or an oil film shortage of a slide bearing thereof do not occur. The filter 2g is disposed between the low-pressure centrifugal pump 2f and the constant-volume pump 2i, and removes fine foreign objects contained in fuel N flowing through the second flow passageway 1b. The check valve 2h is attached to the second flow passageway 1b between the filter 2g and the constant-volume pump 2i, and allows fuel N to pass therethrough only from the filter 2g toward the constant-volume pump 2i.

The constant-volume pump 2i is a pump including, for example, a gear pump or a plunger pump, and is attached to the second flow passageway 1b on the downstream side of the low-pressure centrifugal pump 2f and the filter 2g. The constant-volume pump 2i is a pump which increases the pressure of fuel N of a flow rate proportional to the rotational speed thereof and discharges the fuel N, that is, the constant-volume pump 2i discharges a large amount of fuel at a high rotational speed and discharges a small amount of fuel at a low rotational speed.

The check valve 2j is provided in a flow passageway arranged to be parallel to the constant-volume pump 2i, is configured to allow fuel N to bypass the constant-volume pump 2i only from the downstream side to the upstream side of the constant-volume pump 2i in the second flow passageway 1b, and allows fuel N to pass therethrough when the pressure on the downstream side of the constant-volume pump 2i is greater than that on the upstream side thereof and the difference therebetween is greater than a predetermined value.

As shown in FIG. 1, the measuring mechanism 3 is disposed on the downstream side of the fuel pump mechanism 2. The measuring mechanism 3 includes the metering valve 3a, an opening area-adjusting mechanism 3b, a variation detector 3c, a filter 3d, the throttling valve 3e and a differential pressure-adjusting valve 3f.

The metering valve 3a is provided in the main pipe 1, and controls the flow rate of fuel N flowing through the main pipe 1 by adjusting the opening area of the main pipe 1. The opening area-adjusting mechanism 3b is attached to the metering valve 3a, and is, for example, an electric actuator which drives the metering valve 3a based on instructions from the ECU 4.

The variation detector 3c is connected to the metering valve 3a, and measures the opening area of the main pipe 1 adjusted by the metering valve 3a and outputs measurement results. Although not shown in FIG. 1, the variation detector 3c is electrically connected to the ECU 4, and outputs the measurement results to the ECU 4.

The filter 3d is provided in an intermediate part of a third pressure-leading pipe 6c. The third pressure-leading pipe 6c is part of the pressure-leading pipe 6 and connects the main pipe 1 and an actuator A. The filter 3d removes fine foreign objects remaining in fuel N flowing through the third pressure-leading pipe 6c. Fuel N passes through the filter 3d, and thereby fuel N in which impurities have been reduced can be supplied to the actuator A.

The throttling valve 3e is provided in the main pipe 1 on the downstream side of the metering valve 3a, and adjusts the pressure P2 of fuel N between the metering valve 3a and the throttling valve 3e. The differential pressure-adjusting valve 3f is connected to a fourth pressure-leading pipe 6d and to a fifth pressure-leading pipe 6e. The fourth pressure-leading pipe 6d is part of the pressure-leading pipe 6 and transmits the pressure P1 of fuel N on the upstream side of the metering valve 3a. The fifth pressure-leading pipe 6e is part of the pressure-leading pipe 6 and transmits the pressure P2 of fuel N between the metering valve 3a and the throttling valve 3e.

The differential pressure-adjusting valve 3f generates a driving fuel pressure used for driving the throttling valve 3e in order that the differential pressure between the pressures P1 and P2 becomes matched to a value. The driving fuel pressure is transmitted to the throttling valve 3e via a sixth pressure-leading pipe 6f which is part of the pressure-leading pipe 6, and thereby the opening degree of the throttling valve 3e is adjusted. The throttling valve 3e adjusts the opening degree of the main pipe 1 so that the differential pressure between the pressures P1 and P2 becomes matched to the value. Therefore, the differential pressure between the upstream side and the downstream side of the metering valve 3a always becomes constant without reference to the opening degree of the metering valve 3a, and the flow rate of fuel N discharged into the downstream side of the metering valve 3a changes depending only on the opening area of the main pipe 1 adjusted by the metering valve 3a. Thus, the flow rate of fuel N can be easily adjusted by the metering valve 3a.

Operation information of the airplane body or the engine E is input into the ECU 4, and the ECU 4 controls the opening area-adjusting mechanism 3b and the shut-off valve 5 based on the information. In addition, the ECU 4 is originally a control unit controlling the entire engine F, and is not a device included only in the fuel system 1A of this embodiment. That is, the ECU 4 is configured so that part of the functions thereof performs the control of the fuel system 1A of this embodiment, and functions as an operation controller of the present disclosure. The ECU 4 stores, for example, information of an amount of fuel needed for the engine E, and allows the opening area-adjusting mechanism 3b to adjust the opening degree of the metering valve 3a based on the information of the amount of fuel.

The ECU 4 determines the operation state of the airplane body or the engine E based on the operation information thereof, and selects in accordance with the operation state, one of the constant-volume pump-using mode of increasing the pressure of fuel N using the constant-volume pump 2i and the centrifugal pump-using mode of increasing the pressure of fuel N using the centrifugal pump 2a. For example, it is conceivable that the constant-volume pump-using mode is selected when the rotational speed of the engine E is low because the discharge pressure of the centrifugal pump 2a may become insufficient thereat, and the centrifugal pump-using mode is selected when the rotational speed of the engine E is high. The ECU 4 is connected to the shut-off mechanism 2e, and allows the shut-off mechanism 2e to block the first flow passageway 1a when the fuel system 1A is in the constant-volume pump-using mode and allows the shut-off mechanism 2e to open the first flow passageway 1a when the fuel system 1A is in the centrifugal pump-using mode. In addition, the ECU 4 is connected to the switching mechanism 7, and allows the switching mechanism 7 to connect the downstream end of the second flow passageway 1b and the third flow passageway 1c (namely, the first end of the third flow passageway 1c ) when the fuel system 1A is in the constant-volume pump-using mode, and allows the switching mechanism 7 to connect the downstream end of the first flow passageway 1a and the third flow passageway 1c (namely, the first end of the third flow passageway 1c ) when the fuel system 1A is in the centrifugal pump-using mode.

The ECU 4 is connected to the speed-changing controller 2d. When the fuel system 1A is switched between the constant-volume pump-using mode and the centrifugal pump-using mode, the ECU 4 controls the speed-changing ratio of the speed changer 2c so that the rotational speed of the centrifugal pump 2a becomes equivalent to a rotational speed thereof in which both of the discharge pressures of the centrifugal pump 2a and the constant-volume pump 2i match each other. In addition, for example, the ECU 4 stores the relationship between the rotational speed and the discharge pressure of the centrifugal pump 2a and the relationship between the rotational speed and the discharge pressure of the constant-volume pump 2i in advance.

The ECU 4 is electrically connected to the shut-off valve 5 and can control the shut-off valve 5. The shut-off valve 5 is provided in the main pipe 1 and can stop the flow of fuel N flowing toward the combustor of the engine E by blocking the main pipe 1.

The pressure-leading pipe 6 is a pipe used for transmitting a pressure inside the main pipe 1 or the like, and in this embodiment, the first pressure-leading pipe 6a, the second pressure-leading pipe 6b, the third pressure-leading pipe 6c, the fourth pressure-leading pipe 6d, the fifth pressure-leading pipe 6e and the sixth pressure-leading pipe 6f are provided in the pressure-leading pipe 6. The first pressure-leading pipe 6a is connected to an upstream positon of the metering valve 3a within the main pipe 1 and to the speed-changing controller 2d, and transmits the pressure P1 to the speed-changing controller 2d. The second pressure-leading pipe 6b is connected to a downstream position of the throttling valve 3e within the main pipe 1 and to the speed-changing controller 2d, and transmits the pressure P3 to the speed-changing controller 2d. The third pressure-leading pipe 6c is connected to an upstream position of the metering valve 3a within the main pipe 1 and to the actuator A, and transmits the pressure P1 to the actuator A. The fourth pressure-leading pipe 6d is connected to an upstream position of the metering valve 3a within the main pipe 1 and to the differential pressure-adjusting valve 3f, and transmits the pressure P1 to the differential pressure-adjusting valve 3f The fifth pressure-leading pipe 6e is connected to a portion of the main pipe 1 between the metering valve 3a and the throttling valve 3e and to the differential pressure-adjusting valve 3f, and transmits the pressure P2 to the differential pressure-adjusting valve 3f The sixth pressure-leading pipe 6f is connected to the differential pressure-adjusting valve 3f and to the throttling valve 3e, and transmits the driving fuel pressure used for driving the throttling valve 3e to the throttling valve 3e.

The switching mechanism 7 includes a three-way valve 7a disposed in the connection portion between the first and third flow passageways 1a and 1c, and a three-way valve 7b disposed in the connection portion between the first and second flow passageways 1a and 1b. The three-way valve 7a can change between the position shown in FIG. 1 in which fuel N flows from the downstream end of the second flow passageway 1b via part of the main pipe 1 to the third flow passageway 1c and the position shown in FIG. 2 in which fuel N flows from the downstream end of the first flow passageway 1a to the third flow passageway 1c. The three-way valve 7b can change between the position shown in FIG. 1 in which fuel N flows from the downstream end of the second flow passageway 1b to the measuring mechanism 3 and to the three-way valve 7a and the position shown in FIG. 2 in which fuel N flows from the downstream end of the second flow passageway 1b to the measuring mechanism 3. The switching mechanism 7 connects the downstream end of the second flow passageway 1b and the third flow passageway 1c or connects the downstream end of the first flow passageway 1a and the third flow passageway 1c, by changing the positions of the three-way valves 7a and 7b.

According to the fuel system 1A of this embodiment having the above configuration, in the constant-volume pump-using mode, when the constant-volume pump 2i is rotationally driven, fuel N is supplied from the fuel tank (not shown) to the fuel system 1A of this embodiment in accordance with the rotational speed of the constant-volume pump 2i. First, the pressure of fuel N supplied to the fuel system 1A of this embodiment is increased by the low-pressure centrifugal pump 2f to the extent that cavitation inside the constant-volume pump 2i or an oil film shortage of the slide bearing thereof do not occur, the filter 2g removes foreign objects from the fuel N, and thereafter, the fuel N is supplied to the constant-volume pump 2i.

The pressure of fuel N supplied to the constant-volume pump 2i is increased by the constant-volume pump 2i, and thereafter, the fuel N flows into the main pipe 1 via the second flow passageway 1b, and the metering valve 3a adjusts the flow rate of the fuel N to a flow rate thereof needed for the engine E. Surplus fuel N through this adjustment is returned to an upstream part of the constant-volume pump 2i via the third flow passageway 1c. As shown in FIG. 1, fuel N whose flow rate has been adjusted to an appropriate flow rate by the metering valve 3a is supplied to the combustor of the engine E via a heat exchanger K. In addition, the heat exchanger K cools lubricant used for the engine E by heat-exchanging fuel N and the lubricant.

A driving fuel pressure is transmitted from the differential pressure-adjusting valve 3f to the throttling valve 3e in order that the differential pressure between the pressure P1 on the upstream side and the pressure P2 on the downstream side of the metering valve 3a becomes matched to a value, and the throttling valve 3e adjusts the opening degree of the main pipe 1 so that the differential pressure between the pressures P1 and P2 becomes matched to the value.

On the other hand, in the centrifugal pump-using mode, when the centrifugal pump 2a is rotationally driven, fuel N is pumped at a discharge pressure in accordance with the rotational speed of the centrifugal pump 2a. The pressure of fuel N supplied to the centrifugal pump 2a is increased by the centrifugal pump 2a, and thereafter, the fuel N flows via the third flow passageway 1c, the constant-volume pump 2i and the second flow passageway 1b into the main pipe 1, and the metering valve 3a adjusts the flow rate of the fuel N to a flow rate thereof needed for the engine E. As shown in FIG. 2, fuel N whose flow rate has been adjusted to an appropriate flow rate by the metering valve 3a is supplied to the combustor of the engine E, via the heat exchanger K. In addition, the heat exchanger K cools lubricant used for the engine E by heat-exchanging fuel N and the lubricant.

The speed-changing controller 2d controls the speed-changing ratio of the speed changer 2c so that the differential pressure between the pressure P1 on the upstream side of the metering valve 3a and the pressure P3 on the downstream side of the throttling valve 3e becomes matched to the set value stored in advance. Furthermore, a driving fuel pressure is transmitted from the differential pressure-adjusting valve 3f to the throttling valve 3e in order that the differential pressure between the pressure P1 on the upstream side and the pressure P2 on the downstream side of the metering valve 3a becomes matched to a value, and the throttling valve 3e adjusts the opening degree of the main pipe 1 so that the differential pressure between the pressures P1 and P2 becomes matched to the value.

In the centrifugal pump-using mode, as shown in FIG. 2, although fuel N flows into the second flow passageway 1b and passes through the constant-volume pump 2i, since the pressure of the fuel N is sufficiently increased by the centrifugal pump 2a, the constant-volume pump 2i does not increase the pressure of the fuel N.

In the fuel system 1A of this embodiment as described above, the engine E and the centrifugal pump 2a are connected via the speed changer 2c capable of adjusting the speed-changing ratio thereof. Therefore, the rotational speed of the centrifugal pump 2a can be changed without being proportional to the rotational speed of the engine. Thus, when the fuel system 1A is switched between the centrifugal pump-using mode and the constant-volume pump-using mode, the discharge pressure of the centrifugal pump 2a can be matched to the discharge pressure of the constant-volume pump 2i. Consequently, according to the fuel system 1A of this embodiment, it is possible to limit vibrations or the like occurring when the fuel system 1A is switched between the centrifugal pump-using mode and the constant-volume pump-using mode.

The fuel system 1A of this embodiment includes the shut-off mechanism 2e which blocks the first flow passageway 1a when the fuel system 1A is in the constant-volume pump-using mode and opens the first flow passageway 1a when the fuel system 1A is in the centrifugal pump-using mode. Therefore, when the centrifugal pump-using mode is changed to the constant-volume pump-using mode, the supply of fuel N to the centrifugal pump 2a can be easily stopped.

The fuel system 1A of this embodiment includes the third flow passageway 1c whose first end is connected to the downstream end of the first flow passageway 1a and to the downstream end of the second flow passageway 1b and whose second end is connected to the upstream side of the constant-volume pump 2i within the second flow passageway 1b. Furthermore, the fuel system 1A includes the switching mechanism 7 which connects the downstream end of the second flow passageway 1b and the third flow passageway 1c when the fuel system 1A is in the constant-volume pump-using mode and which connects the downstream end of the first flow passageway 1a and the third flow passageway 1c when the fuel system 1A is in the centrifugal pump-using mode. Therefore, in the constant-volume pump-using mode, surplus fuel N can be returned to the upstream side of the constant-volume pump 2i through the third flow passageway 1c.

Hereinbefore, although an embodiment of the present disclosure has been described with reference to the attached drawings, the present disclosure is not limited to the above embodiment. The shape, the combination or the like of each component shown in the above embodiment is an example, and various modifications based on design requests or the like can be adopted within the scope of and not departing from the present disclosure.

For example, in the above embodiment, a configuration is described in which the speed-changing controller 2d controls the speed-changing ratio of the speed changer 2c based on the pressures (P1 and P3) transmitted from the first pressure-leading pipe 6a and from the second pressure-leading pipe 6b. However, the present disclosure is not limited to this configuration, and a configuration may be adopted in which sensors provided in pipes measure the pressure, the flow rate or the like of fuel N, the ECU 4 determines an optimal speed-changing ratio of the speed changer 2c based on the measured values, and the speed-changing controller 2d controls the speed-changing ratio of the speed changer 2c based on the determined optimal speed-changing ratio.

For example, a configuration may be adopted in which a clutch mechanism is provided between the engine E and the speed changer 2c, and the power of the engine E is not transmitted to the centrifugal pump 2a by disengaging the clutch mechanism when the fuel system 1A is in the constant-volume pump-using mode.

In the above embodiment, in the centrifugal pump-using mode, fuel N whose pressure has been increased by the centrifugal pump 2a flows into the main pipe 1 via the third flow passageway 1c, the constant-volume pump 2i and the second flow passageway 1b. However, the present disclosure is not limited to this configuration, and a configuration may be adopted in which fuel N whose pressure has been increased by the centrifugal pump 2a flows via the main pipe 1 into the metering valve 3a. In this case, the operations of the three-way valves 7a and 7b are appropriately changed. In addition, particularly, in the constant-volume pump-using mode, in a case where surplus fuel N need not be returned to the upstream side of the constant-volume pump 2i, the third flow passageway 1c need not be provided therein.

INDUSTRIAL APPLICABILITY

The present disclosure can be applied to a fuel system including a centrifugal pump and a constant-volume pump and being capable of switching between a mode of increasing the pressure of fuel using the centrifugal pump and another mode of increasing the pressure of fuel using the constant-volume pump.

The invention claimed is:
1. A fuel system comprising:
a constant-volume pump and a centrifugal pump increasing the pressure of fuel to be supplied to an engine for aviation and discharging the fuel;
an operation controller configured to select in accordance with the operation state of the engine, one of a constant-volume pump-using mode of increasing the pressure of fuel using the constant-volume pump and a centrifugal pump-using mode of increasing the pressure of fuel using the centrifugal pump;

a speed changer connecting the engine and the centrifugal pump, changing the rotational speed of rotational power output from the engine and transmitting the rotational power to the centrifugal pump, and being capable of adjusting the speed-changing ratio of the rotational speed;

a first flow passageway in which the centrifugal pump is provided;

a second flow passageway in which the constant-volume pump is provided;

a shut-off mechanism provided on an upstream side of the centrifugal pump in the first flow passageway, and configured to block the first flow passageway when the fuel system is in the constant-volume pump-using mode and to open the first flow passageway when the fuel system is in the centrifugal pump-using mode;

a third flow passageway whose first end is connected to a downstream end of the first flow passageway and to a downstream end of the second flow passageway, and whose second end is connected to an upstream side of the constant-volume pump in the second flow passageway; and a switching mechanism comprising two three-way valves, the switching mechanism configured to connect the downstream end of the second flow passageway and the third flow passageway when the fuel system is in the constant-volume pump-using mode, and to connect the downstream end of the first flow passageway and the third flow passageway when the fuel system is in the centrifugal pump-using mode.

* * * * *